United States Patent
Krantz

[19]

[11] Patent Number: 6,157,591
[45] Date of Patent: Dec. 5, 2000

[54] SONIC RANGE FINDER WITH LASER POINTER

[75] Inventor: Norman L. Krantz, San Jose, Calif.

[73] Assignee: Zircon Corporation, Campbell, Calif.

[21] Appl. No.: 09/374,093

[22] Filed: Aug. 12, 1999

[51] Int. Cl.$^7$ .................................................. G01S 15/00
[52] U.S. Cl. ............................................ 367/99; 367/107
[58] Field of Search ............................ 367/99, 103, 107, 367/908, 910; 73/629, 627, 633, 632, 655

[56] References Cited

U.S. PATENT DOCUMENTS

| | | | |
|---|---|---|---|
| 4,910,717 | 3/1990 | Terry | 367/99 |
| 5,287,627 | 2/1994 | Rando | 367/99 |
| 5,773,721 | 6/1998 | Bashyam | 73/655 |

OTHER PUBLICATIONS

Webpage, Raytek® "Raynger® MX™ Close Focus", 2 pgs., printed out Feb. 24, 2000.
Product description, 1 pg., not dated.

*Primary Examiner*—Ian J. Lobo
*Attorney, Agent, or Firm*—Skjerven Morrill MacPherson, LLP; Gregory T. Powell; Norman R. Klivans

[57] ABSTRACT

An ultrasonic distance measuring device for use, for instance, in the building trades, conventionally measures distance by projecting a sonic beam towards the target and detecting the reflection from the target. Also provided is an associated co-axial laser pointer which provides a visual indication of where the sonic beam is pointed. This laser pointer provides a laser beam which illuminates the target. However, the laser beam is not a typical laser beam, but instead is diffracted so that it covers an area at the target approximately the same size and shape as the area covered by the sonic beam. This provides a clear indication to the user that the sonic beam is not a single point beam but instead is possibly reflecting from any one of a number of points on the target. This provides a better indication to the user than does the single point beam of what possible locations are being measured on the target The laser beam pattern is, for instance, a circular area, a pattern of lines or rings, or a set of dots including a bright central dot.

17 Claims, 4 Drawing Sheets

SONIC RANGE FINDER WITH LASER POINTER

FIELD OF THE INVENTION

This invention relates to sonic distance measuring and more specifically to an apparatus and method for visually indicating the location of an object to which a distance is being measured.

BACKGROUND

Sonic distance measuring devices (range finders) are well known; see e.g., U.S. Pat. No. 4,910,717, assigned to Sonin, Inc. and incorporated herein by reference.

Such measuring devices operate on the well-known sonar principal. They direct a sonic beam (a stream of acoustic waves) from the measuring device to the target and detect the time of transit from the measuring device to the target and back to determine the distance from the measuring device to the target. While sonar is typically used underwater, for instance for submarine purposes, sonic commercial type measuring devices are typically used in the building trades to measure relatively short distances, for instance, for determining floor area of a room of a house or generally to measure distances of five to about one hundred feet. Typically the sonic pulses are ultrasonic.

A number of such devices on the market, such as the Stanley Works Intellimeasure and devices supplied by Sonin, Inc., additionally include a laser pointer as part of the measuring device. The laser pointer is mounted co-axial with the sonic beam and projects a small visible dot on the object at which the distance measuring device is pointed. This provides an indication to the user where the device is pointed.

The present inventor, however, has determined that there is a drawback to this approach because such an ultrasonic measuring device actually emits a cone of acoustic waves. This acoustic cone has its vertex at the measuring device and its base at the target. This cone is relatively large in diameter at its base due to the nature of acoustic waves, so the acoustic cone at its base is much larger than the laser pointer dot. That is, any object within the base of the acoustic cone may reflect the acoustic waves and thus one may be measuring distance anywhere and everywhere within the acoustic cone. However, the user of such a device with the laser pointer feature may be easily misled into believing that he is measuring precisely the distance to the object reflecting the dot. Hence it is possible to obtain a measurement which is extremely inaccurate since the distance to the wrong object (or portion of the object) is being measured.

SUMMARY

In accordance with this invention, such a sonic range finder with a laser pointer feature is modified so that, instead of merely projecting a dot, a much larger pattern is projected, such as a large circle, which subtends a similar solid (conical) angle as does the acoustic wave, e.g., in the form of a cone. Hence the laser pattern at the target is a visual indication at the point where the cone intersects the target. Since a typical solid angle subtended by the cone of the acoustic wave is about ten degrees, in accordance with the invention, a similar ten degree cone of light is projected in one embodiment. Thus the pattern is larger when the target is farther away and smaller when the target is nearer. Thus the pattern projected by the laser beam approximates that of the projected sonic beam.

In one embodiment, this laser beam pattern is generated by directing the beam from a low powered laser through a diffraction grating. This diffracts the laser beam which then spreads out, unlike a conventional laser beam.

In certain embodiments, rather than merely a uniform diffracted circular pattern, the projected pattern is a circle of dots or a pattern of lines. In one embodiment, there is a bright center dot surrounded by a darker area with an outer perimeter at the base of the cone having more dots. This is useful in high light situations, such as for an outdoors, so the user has an idea where he is pointing even if he cannot see the entire pattern due to the high ambient light level.

DETAILED DESCRIPTION

Figure 1:
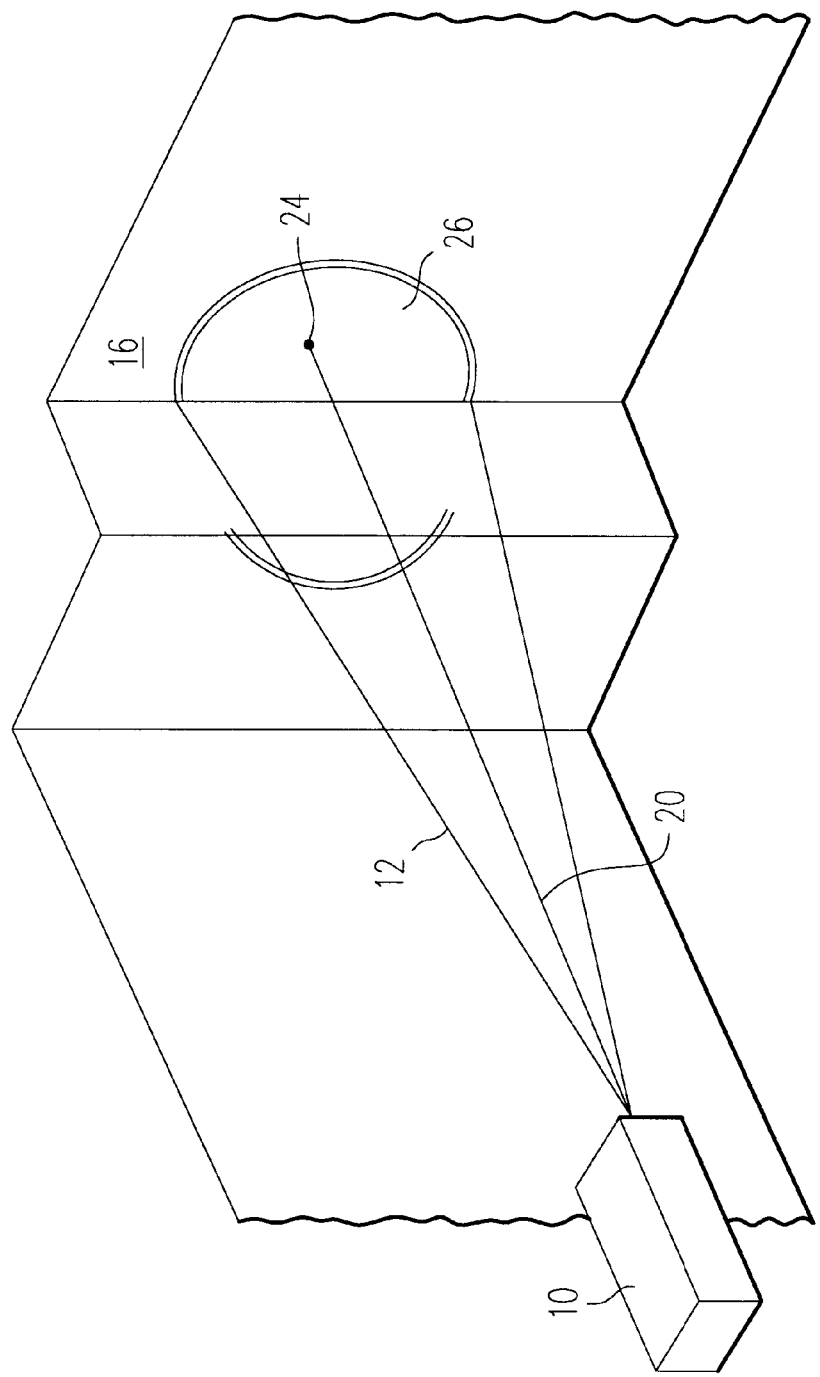
FIG. 1 shows a prior art distance measuring device.

FIG. 1 shows generally use of a prior art sonic distance measuring device 10 as described above. Device 10 projects a sonic beam 12 which as shown subtends a cone. Sonic beam 12 is incident on the target 16 which is, for instance, a wall of a building. Device 10 measures a distance from the device 10 to the wall 16. Device 10 also includes a low powered laser diode (not shown) which outputs a laser beam 20 co-axial with the sonic beam 12. The laser beam 20, being a coherent light beam, even at wall 16 is a very narrow beam which results in a small dot 25 projected on wall 16. The user of device 10 sees the dot 24 and understands that the distance is being measured to the location of dot 24.

Of course this is not necessarily the case; due to the well known vagaries of acoustic beams and their often unpredictable reflections as well as the fact that the output beam 12 is subject to various disturbances, instead, one may be measuring the distance to wall 16 anywhere within the base of area 26 cone 12. If, as is typically the case, wall 16 is not flat or area 26 includes a corner or a protrusion of wall 16 as shown, then, for this additional reason, the distance measured may in fact not be exactly to the point of dot 24 but may be some other distance within area 26. Hence the prior art approach of FIG. 1 is inherently rather misleading due to laser generated dot 24 being a point while the actual distance measured may be to anywhere within area 26.

Figure 2:
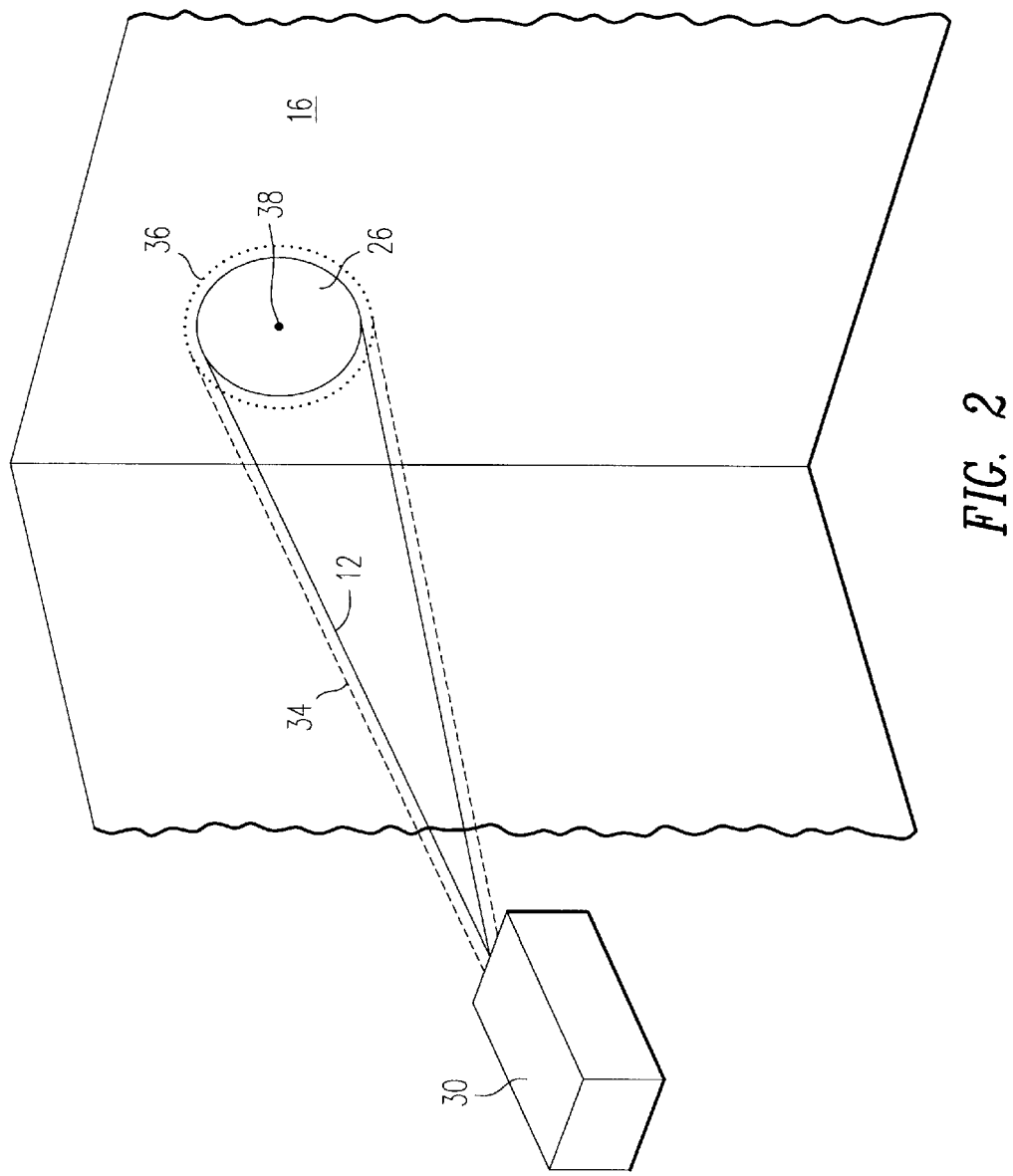
FIG. 2 shows a distance measuring device in accordance with this invention.

In accordance with this invention, this problem of FIG. 1 is remedied in FIG. 2, which shows a range finder device 30 in accordance with this invention projecting an acoustic beam 12 just as in FIG. 1. However, in this case the laser beam 34 subtends a cone of about the same size and approximately co-axial with that of acoustic beam 12. Therefore the pattern 36 projected by the laser beam 34 is approximately the same size in terms of its envelope (outside dimensions) as the area 26 which is the base of the cone of the acoustic beam 12.

In one embodiment, as shown in FIG. 2, the pattern 36 generated by the laser beam is not a simple circle of diffracted laser light, but is a circle of dots, each of which is of relatively high intensity, interposed with regions of lesser illumination or no illumination. In one example there are 36 equally spaced dots in the circle. Also in this case the laser pattern 36 includes a central dot 38. This, as described above, is especially useful in high-ambient light conditions for finding at least the center point of the pattern 36, thus providing the indication also as to the outer portion of the pattern 36; even if the outer portion of the pattern 36 is less visible, the center dot 38 is readily detected, so the user's eye will more readily also observe the perimeter of the pattern 36.

Thus the pattern shown in FIG. 2 is especially advantageous in terms of "user friendliness" by allowing the user to determine the center of the pattern 36 and also the perimeter readily, even in high-ambient light conditions. (Often a device 30 as shown in FIG. 2 is used outdoors during construction.) Note that the sonic and distance measuring portions of the device 30 are identical to those in the prior art as described above; only the laser beam is different in its configuration.

Figure 3A:
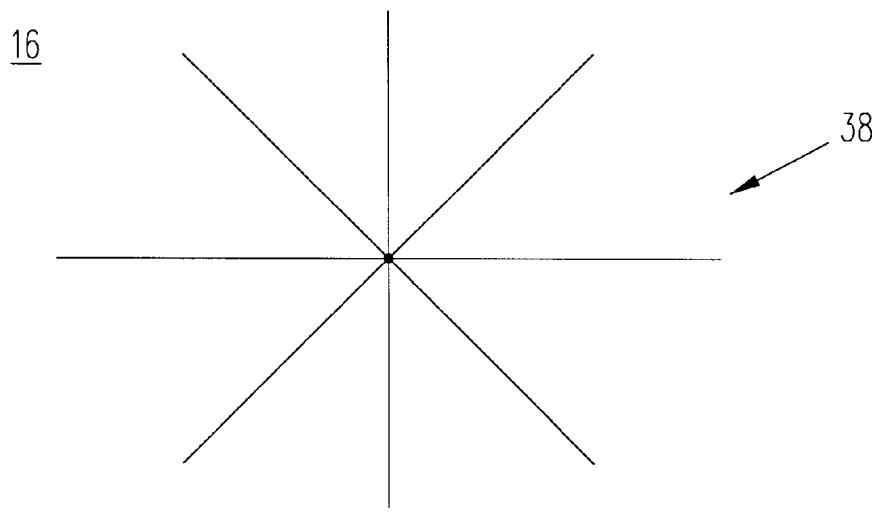
FIG. 3A shows one embodiment of a visible pattern generated by a distance measuring device in accordance with this invention using lines.
Figure 3B:
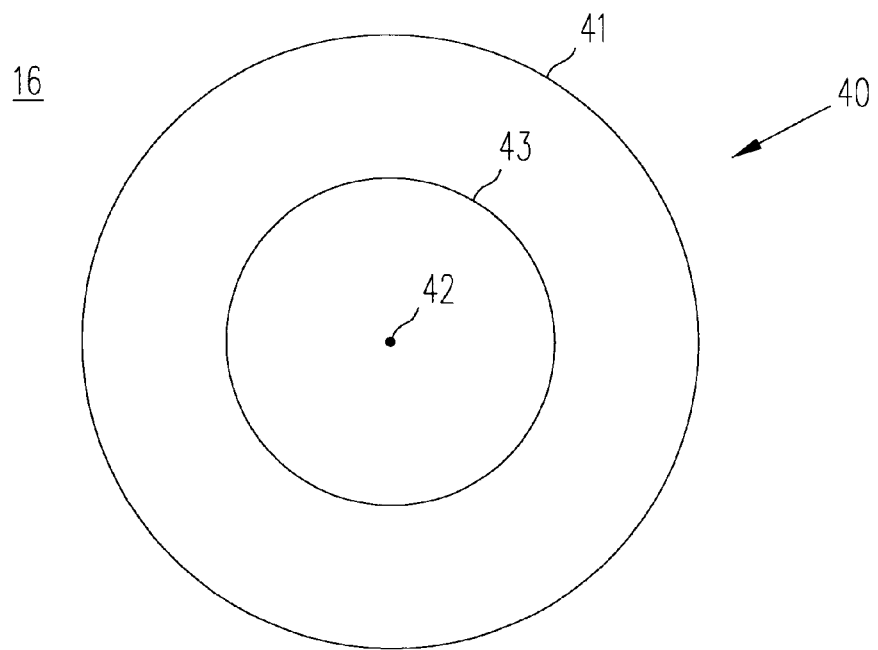
FIG. 3B shows another embodiment of a visible pattern generated by a distance measuring device in accordance with this invention using circles.

FIGS. 3A and 3B respectively show variants of pattern 36. In FIG. 3A, the pattern 38, which is the pattern generated on the target 16, is a set of intersecting lines, intersecting at the center point.

In FIG. 3B, pattern 40 as shown on target 16 is a central dot 42 surrounded by high light level circles. (It is to be understood that since FIGS. 2, 3A, 3B are illustrations, the bright portions are shown dark and the dark portions are the surrounding white space. Of course, this is the opposite of what is actually seen by the eye.) The patterns 36, 38, 40, and variants thereof, are readily achieved. The laser source is, e.g., a conventional low-powered laser diode, for instance, part no. LNH-CH2-650F from Hotech International outputting red light at less than 5 mW output power (class 3A). These are the sort of low-powered laser sources typically used in commercially available laser pointers. To achieve the diffused patterns shown in FIGS. 2, 3A, 3B, and other types of patterns, the laser beam is directed through a diffraction grating or other optical element (such as a holographic element) which diffracts the laser beam into a non-parallel light beam. The amount of diffraction, of course, is selected so as to achieve a laser beam cone which subtends approximately the same angle as the accompanying acoustic beam. For instance, in a typical laser range finder where it is desired to have a cone angle of ten degrees, a suitable diffraction grating is provided. A suitable diffraction grating is part no. HDGC-42 from Hotech International to achieve the pattern of FIG. 2. Other optical elements may be substituted for the diffraction grating to achieve this diffraction effect, for example, a holographic element and/or suitable lenses. The dot or line effects of FIGS. 2, 3A, 3B are each achieved by a suitably designed diffraction grating.

Figure 4:
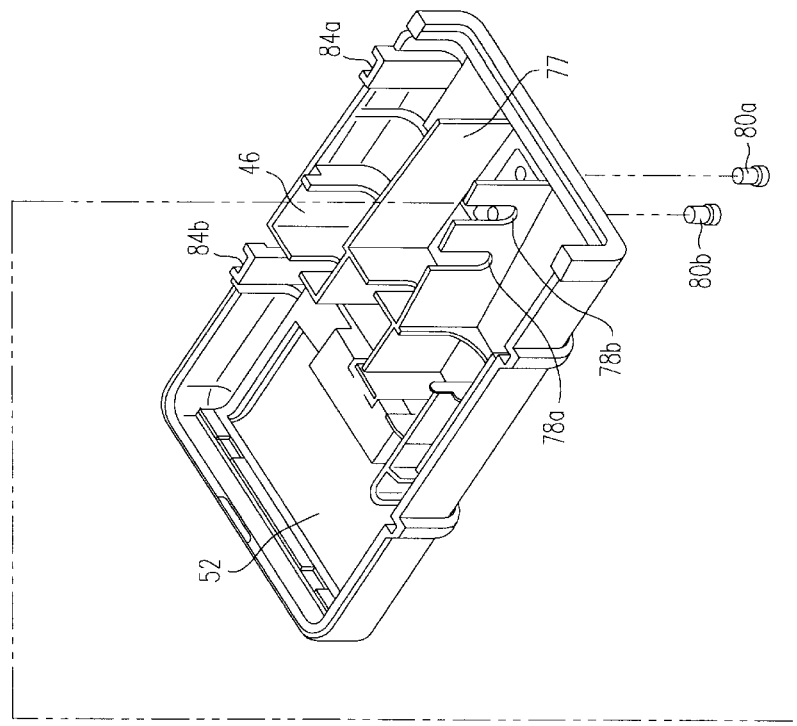
FIG. 4 is an exploded view of one embodiment of the laser source and optical element installed in a distance measuring device in accordance with this invention.
Figure 4:
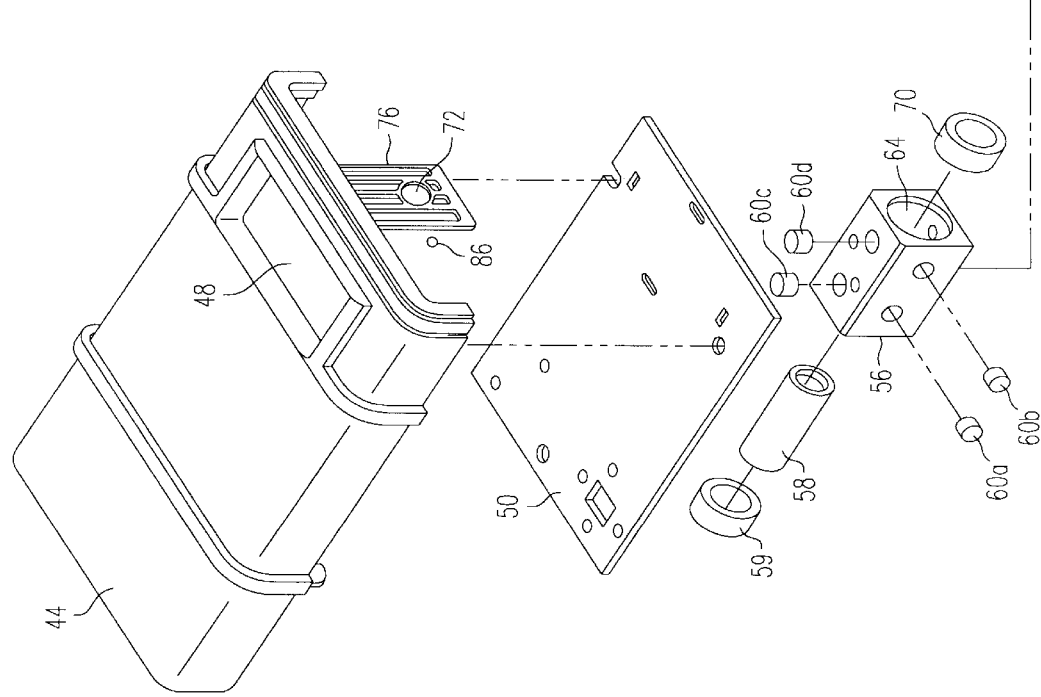

FIG. 4 shows an exploded view of a distance measuring device in accordance with an embodiment of the invention and which operates as described above. This particular embodiment is a hand-held portable device; of course, this is merely illustrative. The device which is intended for use, for instance, in the construction trades includes in this embodiment an upper housing 44 and a lower housing 46. The upper housing 44 has a window 48 through which is visible a readout of the distance measured, as is conventional in such devices. The various ribs and supporting structures shown in the upper and lower housings are conventional and are of the type to provide a relatively rugged and manufacturable device; the upper housing and lower housing 44 and 46 are typically molded plastic.

Held between the upper housing and lower housing is a conventional printed circuit board assembly 50 on which are located the various electronic components (not shown) needed to achieve the conventional distance measuring including, for instance, an LCD observed through window 48. The lower housing 46 includes a battery compartment 52. The upper housing and lower housing are held together by a screw, typical of small hand-held devices.

There is also provided laser module holder 56 which is a support member in which is held the laser module 58 which is held in place by elastomeric supports (e.g., foam pads) 59 and 70 in the laser module holder 56. The laser diode, a collimating lens, and the diffraction grating are arranged in line in laser module 58. Set screws 60a, 60b, 60c, and 60d are provided to allow adjustment of the aiming of the laser module 58 through the port 64. Also, inset into port 64 is a second elastomeric support 70. Suitable electrical connections (not shown) are provided to power the laser diode in its module 58 from the battery when the device is turned on via a conventional on/off switch (not shown).

Light emitted from the laser module 58 passes through associated port 72 in flange 76, which is a part of the upper housing 44. The printed circuit board assembly 50 and the laser assembly are accommodated within the lower case 46. As can be seen, structure 77 in lower case 46 accommodates the laser module holder 56. Structure 77 defines cutouts 78a, 78b for accommodating the set screws 60a, 60b. Mounting screws 80a, 80b hold the laser module holder 56 in the lower case 46. Structures 84a, 84b are snaps to capture the upper housing 44. The illustrated external and internal detail is partly decorative and partly for structural reasons; as is apparent, a variety of such arrangements are possible.

Various modifications are apparent in accordance with this invention. Specifically, the laser beam is co-axial with respect to the acoustic beam only in a relatively imprecise sense in terms of being projected towards the same target; they need not share the same axis. For instance, in the FIG. 4 device, the acoustic waves are emitted from point 86. "Sonic" as used here includes ultrasonic, audible, and subsonic acoustic waves; typically ultrasonic waves are used because they perform best and also of course because they are not audible. The laser pattern approximates the sonic beam only in its general outline in terms of its approximate dimensions and not in terms of relative intensity or being exactly the same shape or size. The approximation is merely similar enough so as to give a visible indication of approximately the area painted on the target by the sonic beam.

This disclosure is illustrative and not limiting; further modifications will be apparent to one skilled in the art in light of this disclosure and are intended to fall within the scope of the appended claims.

I claim:

1. A distance measuring apparatus, comprising:
   a sonic distance measuring device projecting a sonic beam;
   a laser source mounted to direct a laser beam approximately co-axially with the sonic beam; and
   an optical element located to diffract the laser beam, thereby to project a visible pattern approximating the projected sonic beam.

2. The apparatus of claim 1, wherein the optical element is one of a diffraction grating, a holographic element, or a lens.

3. The apparatus of claim 1, wherein the visible pattern is conical in a direction parallel to an axis of the laser beam.

4. The apparatus of claim 1, wherein the visible pattern is circular in a plane normal to an axis of the laser beam.

5. The apparatus of claim 1, wherein the visible pattern has a central region brighter than a surrounding portion of the visible pattern.

6. The apparatus of claim 1, wherein the visible pattern includes a plurality of bright regions with intervening darker regions.

7. The apparatus of claim 1, wherein the apparatus is in a housing, and further comprising a support member fixed in the housing, the laser source and the optical element being held on the support member.

8. The apparatus of claim 1, wherein the visible beam displays a characteristic of the sonic beam.

9. The apparatus of claim 8, wherein the characteristic is one of a perimeter or a center point.

10. A method of measuring distance to an object, comprising the acts of:
   projecting a sonic beam;
   detecting a reflection of the sonic beam from the object, thereby to determine a distance to the object; and
   projecting to the object a diffracted laser beam co-axially to the sonic beam, thereby to illuminate a portion of the object approximating a portion of the object on which the sonic beam is incident.

11. The method of claim 10, wherein the laser beam is diffused by one of a diffraction grating, a holographic element, or a lens.

12. The method of claim 10, wherein a pattern of the laser beam is conical in a direction parallel to an axis of the laser beam.

13. The method of claim 10, wherein a pattern of the laser beam is circular in a plane normal to an axis of the laser beam.

14. The method of claim 10, wherein a pattern of the laser beam has a central region brighter than a surrounding portion of the pattern.

15. The method of claim 10, wherein a pattern of the laser beam includes a plurality of bright regions with intervening darker regions.

16. The method of claim 10, wherein the projected laser beam displays a characteristic of the sonic beam.

17. The method of claim 16, wherein the characteristic is one of a perimeter or a center point.

* * * * *